United States Patent
Ito et al.

(10) Patent No.: US 6,867,557 B2
(45) Date of Patent: Mar. 15, 2005

(54) LIGHTING CIRCUIT

(75) Inventors: Masayasu Ito, Shizuoka-ken (JP);
Hitoshi Takeda, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/679,847

(22) Filed: Oct. 6, 2003

(65) Prior Publication Data

US 2004/0066154 A1 Apr. 8, 2004

(30) Foreign Application Priority Data

Oct. 8, 2002 (JP) .................................. 2002-295485

(51) Int. Cl.[7] .............................................. H05B 37/00
(52) U.S. Cl. .................................. 315/307; 315/77
(58) Field of Search ................................ 315/307, 291, 315/77–82, 224, 209 R; 307/10.7, 10.1; 340/815.45

(56) References Cited

U.S. PATENT DOCUMENTS 5,693,986 A * 12/1997 Vettraino et al. .......... 307/10.7
6,515,434 B1 * 2/2003 Biebl ...................... 315/185 R
6,798,152 B2 * 9/2004 Rooke et al. ................ 315/307

FOREIGN PATENT DOCUMENTS

| JP | 61-48836 | 4/1986 | ............ B60Q/1/44 |
| JP | 2001-215913 | 8/2001 | ............ G09G/3/14 |

OTHER PUBLICATIONS

ESP@CENET Database—12, Publication No. JP2001215913, Publication Date: Aug. 10, 2001.

* cited by examiner

Primary Examiner—Wilson Lee
(74) Attorney, Agent, or Firm—Osha & May L.L.P.

(57) ABSTRACT

A lighting circuit for lighting a vehicular lamp including a plurality of light sources each having at least one light-emitting diode, includes: a switching regulator for outputting an output voltage based on a power-supply voltage received from an external DC power supply; a light source selecting unit for selecting the respective light sources one by one and supplying a supply current to a selected one light source by applying the output voltage of the switching regulator to the selected one light source; and an output controlling unit for controlling the output voltage output by the switching regulator to the selected one light source based on the supply current supplied to the selected one light source.

5 Claims, 3 Drawing Sheets

LIGHTING CIRCUIT

This patent application claims priority from a Japanese patent application No. 2002-295485 filed on Oct. 8, 2002, the contents of which are incorporated herein by reference.

BACKGROUND OF THE INVENTION

1. Field of the Invention

The present invention relates to a vehicular lamp. More particularly, the present invention relates to a lighting circuit for lighting a vehicular lamp including a plurality of light sources.

2. Description of the Related Art

Conventionally, a switching regulator that supplies power to a light source of a vehicular lamp is known as disclosed in see Japanese Patent Application Laid-Open No. 2001-215913, page 3 and FIG. 7, for example. An output voltage of the switching regulator is controlled based on a current flowing in the light source, for example. Moreover, a vehicular lamp is known which switches brightness of the light source by switching resistance of a resistor connected in series with the light source as disclosed in Japanese Utility Model Laid-Open No. 61-48836, page 1, for example.

In a vehicle, various light sources such as a stop lamp and a taillight are mounted. Thus, in a case of driving these various lamps by the switching regulator, there was a problem that the switching regulator should be provided for each of the light sources, thus increasing the cost. In addition, in a case where the current flowing in the light source is limited by using the resistor connected in series with the light source, there was a problem that power consumption of the vehicular lamp increased.

SUMMARY OF THE INVENTION

Therefore, it is an object of the present invention to provide a lighting circuit, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a lighting circuit for lighting a vehicular lamp including a plurality of light sources each having at least one light-emitting diode, comprises: a switching regulator operable to output an output voltage based on a power-supply voltage received from an external DC power supply; a light source selecting unit operable to select the light sources one by one and supply a supply current to a selected one of the light sources by applying the output voltage of the switching regulator to the selected one light source; and an output controlling unit operable to control the output voltage output by the switching regulator to the selected one light source based on the supply current supplied to the selected one light source. The lighting circuit may further comprise: a plurality of capacitors connected in parallel to the plurality of light sources, respectively; and a plurality of diodes connected in forward direction between the switching regulator and the plurality of capacitors, respectively.

The output controlling unit may include: reference-value outputting units, provided to correspond to the plurality of light sources, respectively, operable to output reference values different from one another, respectively; and a selection-comparison unit operable to control the output voltage of the switching regulator based on a result of comparison of the supply current supplied to the selected one light source selected by the light source selecting unit with one of the reference values output from one of the reference-value outputting units that corresponds to the selected one light source, and wherein the switching regulator supplies the supply current to each of the plurality of light sources, the supply current being different between the plurality of light sources.

The switching regulator may include: a switching device operable to repeatedly switch whether or not a power-supply current based on the power-supply voltage is allowed to flow in the switching regulator; and a coil operable to output the supply current based on the power-supply voltage, and wherein the output controlling unit includes: a plurality of voltage comparators provided to correspond to the plurality of light sources, respectively, each of the voltage comparator comparing a detecting voltage generated based on the supply current to a reference voltage that was determined in advance to correspond to a corresponding one of the light sources; and a switch controller operable to control the supply current by controlling a duration ratio of a period during which the switching device is on and a period during which the switching device is off based on an output of one of the voltage comparators that corresponds to the selected one light source selected by the light source selecting unit.

The lighting circuit may further comprise a selection signal supplying unit operable to supply a light-source selecting signal that specifies the plurality of light sources one by one to the light source selecting unit and the output controlling unit, wherein the light source selecting unit selects one of the light sources specified by the light-source selecting signal and supplies the supply current to the one light source specified by the light-source selecting signal, and the switch controller controls the supply current based on the output of the one of the voltage comparators that corresponds to the one light source specified by the light-source selecting signal.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
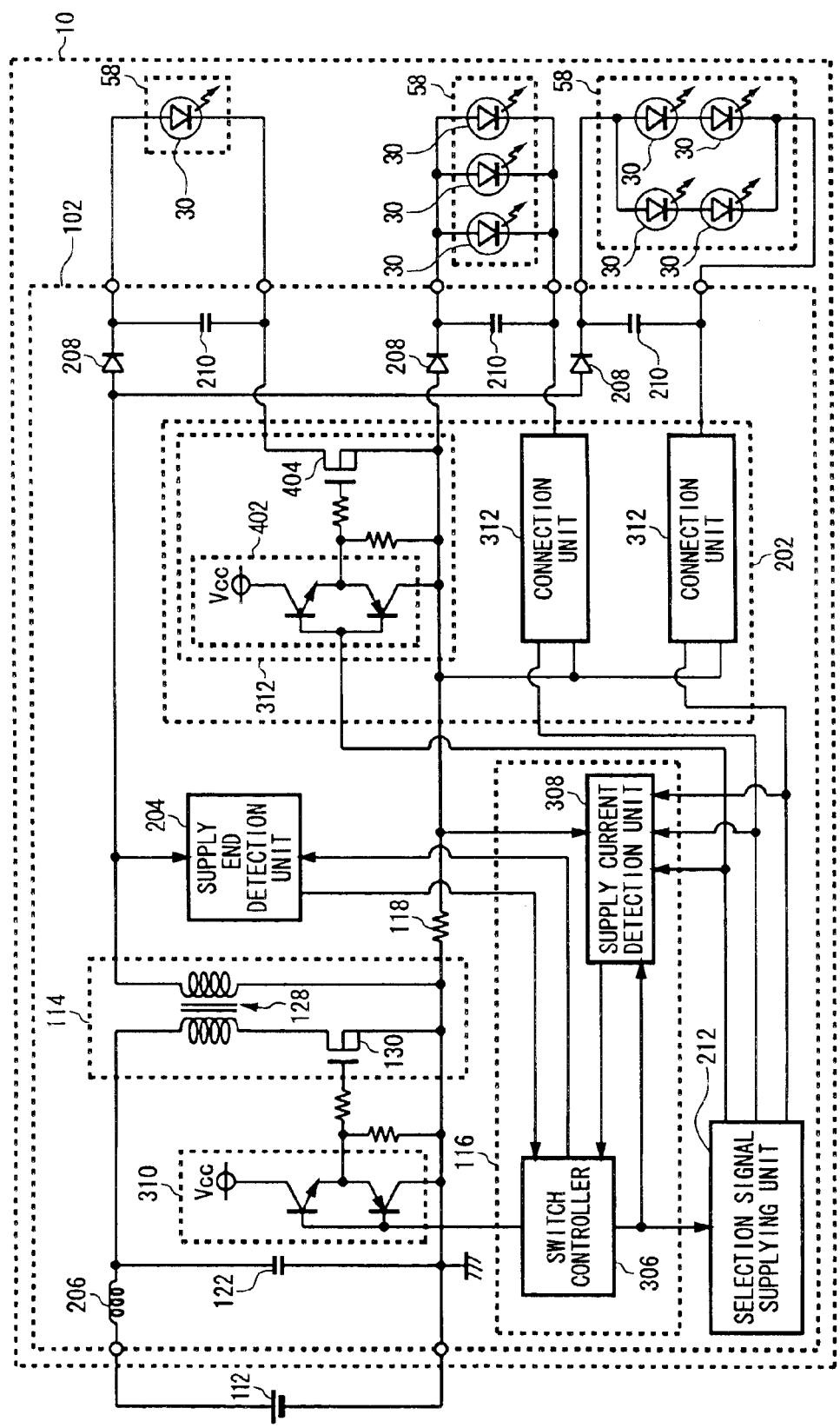
FIG. 1 shows an exemplary circuit structure of a vehicular lamp 10 according to an embodiment of the present invention.

FIG. 1 shows an exemplary circuit structure of a vehicular lamp 10 according to an embodiment of the present invention. The vehicular lamp 10 can supply different currents to a plurality of light source blocks 58. The vehicular lamp 10 includes a plurality of light source blocks 58 and a lighting circuit 102.

The light source blocks 58 include one or more light-emitting diodes 30. The number of the light-emitting diodes 30 contained in one light source block 58 is different from the light source blocks 58. Thus, the light source blocks 58 receive currents that are different in the current amount from the lighting circuit 102.

Each light source block 58 is, for example, a stop lamp, a taillight, a turn signal lamp, a back lamp or a clearance lamp. The light source blocks 58 are mounted on the vehicle as a rear combination lamp, for example. Each of the light source blocks 58 may be each of high beam and low beam of a headlamp. In an alternative example, a part or all of the light source blocks 58 may include the same number of light-emitting diodes 30.

The lighting circuit 102 supplies to the light source block 58 a supply current based on a power-supply voltage received from a DC power supply 112 provided in the outside of the vehicular lamp 10. The lighting circuit 102 includes a switching regulator 114, a coil 206, a capacitor 122, a selection signal supplying unit 212, a light source selecting unit 202, a resistor 118, an output controlling unit 116, a supply end detection unit 204, a plurality of diodes 208 and a plurality of capacitors 210. The DC power supply 112 is, for example, a battery for vehicle.

The selection signal supplying unit 212 supplies a light-source selecting signal that specifies a plurality of light source blocks 58 one by one, to the light source selecting unit 202 and the output controlling unit 116. Moreover, the selection signal supplying unit 212 changes the light-source selecting signal in accordance with a driving signal received from the output controlling unit 116, thereby sequentially switching the light source block 58 specified by the light-source selecting signal.

The light source selecting unit 202 includes a plurality of connection units 312 that are provided to correspond to the light source blocks 58, respectively. The connection unit 312 is provided in series with the corresponding light source block 58 and is connected to the switching regulator 114 via the resistor 118.

In this example, the connection unit 312 includes a buffer 402, an NMOS transistor 404 and a plurality of resistors. The buffer 402 includes an NPN transistor and a PNP transistor that are connected in series, and gives its output based on the light-source selecting signal received as its input, to a gate terminal of the NMOS transistor 404 via the resistor. Moreover, a drain terminal of the NMOS transistor 404 is electrically connected to the light source block 58 while a source terminal thereof is electrically connected to the resistor 118. Thus, the NMOS transistor 404 electrically connects the light source block 58 to the switching regulator 114 in accordance with the light-source selecting signal.

In this manner, the light source selecting unit 202 selects one of the light source blocks 58 sequentially in accordance with the light-source selection signal. Moreover, the light source selecting unit 202 applies an output voltage of the switching regulator 114 to the selected light source block 58 so as to supply a supply current to the selected light source block 58. Furthermore, in this manner, the light source selecting unit 202 makes the light-emitting diode 30 included in this selected light source block 58 emit light in accordance with the supply current.

The resistor 118 is connected in series with the light source block 58 by being inserted between the switching regulator 114 and the light source selecting unit 202. Thus, the resistor 118 generates a supply-current detecting voltage based on the supply current flowing in the light source block 58 selected by the light source selecting unit 202, across the resistor 118.

The output controlling unit 116 includes a supply current detection unit 308 and a switch controller 306. The supply current detection unit 308 detects the supply current based on the supply-current detecting voltage generated by the resistor 118 and also supplies the detection result to the switch controller 306. In this example, the supply current detection unit 308 outputs the detection result in a case where the driving signal received from the output controlling unit 116 has a predetermined value.

The switch controller 306 supplies a switch controlling signal based on the result of detection of the supply current by the supply current detection unit 308 to the switching regulator 14 via a buffer 310 and a resistor so as to control the output voltage of the switching regulator 114. In other words, the output controlling unit 116 controls the output voltage that is output by the switching regulator 114 to the light source block 58 selected by the light source selecting unit 202, based on the supply current supplied to that selected light source block 58. In this example, the switch controller 306 further supplies a driving signal or an inverted signal of the driving signal to the selection signal supplying unit 212, the supply current detection unit 308 and the supply end detection unit 203, thereby controlling these units.

The switching regulator 114 includes an NMOS transistor 130 and a transformer 128. The NMOS transistor 130 is connected to a primary coil of the transformer 128 in series and receives the switch controlling signal output by the switch controller 306 at a gate terminal thereof. The NMOS transistor 130 switches based on the thus received switch controlling signal whether or not a power-supply current based on the power-supply voltage received from the DC power supply 112 is allowed to flow in the switching regulator 114.

The transformer 128 includes the primary coil for receiving the power-supply voltage and a secondary coil for outputting an output voltage based on the power-supply voltage received by the primary coil. The secondary coil applies the output voltage to the light source block 58 to supply the supply current to the light source block 58. In this example, the primary coil of the transformer 128 is electrically connected to the DC power supply 112 via a coil 206 and receives the power-supply voltage smoothened by a capacitor 122. The secondary coil of the transformer 128 outputs the supply current based on the power-supply current flowing in the primary coil.

In this example, the transformer 128 accumulates an energy based on the power-supply voltage during a period in which the NMOS transistor 130 is on, and outputs the accumulated energy as the output voltage and the supply current during a period in which the NMOS transistor 130 is off. Thus, the switching regulator 114 outputs the supply current that is the maximum immediately after the NMOS transistor 130 has been turned off and then gradually decreases. In this manner, the switching regulator 114 outputs a predetermined current amount of the supply current every time the NMOS transistor 130 that is on is switched to be off.

The supply end detection unit 204 detects, as an end of output of the supply current from the switching regulator 114, that the output voltage of the switching regulator 114 becomes lower than a predetermined voltage. Then, in a case where the driving signal has a predetermined value, the supply end detection unit 204 supplies an end detection signal indicating that the end of output of the supply current was detected to the switch controller 306 in accordance with the detection of that end.

The output controlling unit 116 changes the switch controlling signal in accordance with the end detection signal received from the supply end detection unit 204 so as to turn on the NMOS transistor 130. Thus, the transformer 128 accumulates energy for outputting the next supply current.

Moreover, the output controlling unit 116 changes the driving signal in accordance with the end detection signal, thereby making the selection signal supplying unit 212 output the light-source selecting signal for specifying the next light source block 58. The output controlling unit 116 then turns off the NMOS transistor 130 again so as to supply the next supply current to this light source block 58. In this manner, according to this example, it is possible to select a plurality of light source blocks 58 one by one so as to sequentially supply the power to the selected light source block 58.

The capacitors 210 are provided to correspond to the light source blocks 58, respectively, and each capacitor 210 is connected to the corresponding light source block 58 in parallel. Thus, during a period in which the light source selecting unit 202 selects the corresponding light source block 58, the capacitor 210 is charged. On the other hand, during a period in which the light source selecting unit 202 does not select the corresponding light source block 58, the capacitor 210 supplies a current based on the thus charged electric charges to the corresponding light source block 58. In this manner, the capacitor 210 smoothens the supply current received from the switching regulator 114 and supplies the thus smoothened supply current to the corresponding light source block 58.

A plurality of diodes 208 are provided to connect the light source blocks 58, respectively, and are connected between the switching regulator 114 and the corresponding capacitors 210 in forward direction. Thus, during the period in which the light source selecting unit 202 does not select the corresponding light source block 58, the diode 208 prevents the current based on the electric charges charged in the capacitor 210 from flowing back to other light source blocks 58 other than the corresponding light source block 58 or the like. Therefore, according to this example, a plurality of light source blocks 58 can be allowed to emit light independently of each other based on the power output by a single switching regulator 114.

In this example, the switching regulator 114 is a flyback switching regulator. In an alternative example, the switching regulator 114 may be another type of switching regulator, such as a forward or step-down type. The switching regulator 114 may include a coil for supplying the current received from the DC power supply 112 to the light source block 58, in place of the transformer 128.

Figure 2A:
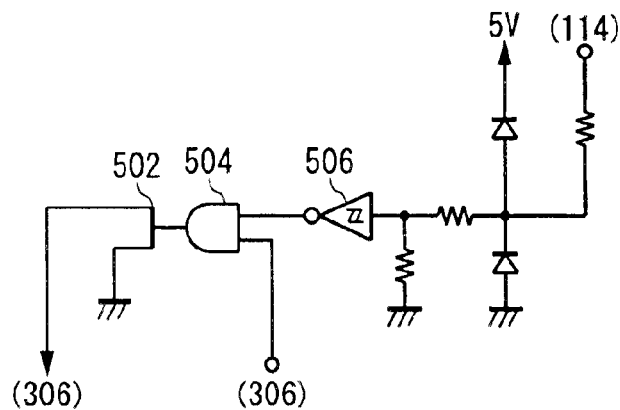
FIG. 2A shows an exemplary circuit structure of a supply end detection unit 204.

FIG. 2A shows an exemplary circuit structure of the supply end detection unit 204. In this example, the supply end detection unit 204 includes a schmitt trigger 506, an AND operator 504 and an analog switch 502.

An input of the Schmitt trigger 506 is clamped by a plurality of diodes to be a predetermined voltage. The Schmitt trigger 506 supplies an output in accordance with the output signal of the switching regulator 114 received via a resistor to the AND operator 504. The AND operator 504 further receives an inverted signal of the driving signal from the switch controller 306 and supplies the output of the AND operator 504 to the analog switch 502. The analog switch 502 grounds its output end other than an end connected to the switch controller 306 in accordance with the output of the AND operator 504. In this manner, the supply end detection unit 204 supplies the end detection signal to the switch controller 306 in accordance with the decrease of the output voltage of the switching regulator 114 in a case where the driving signal has a predetermined value.

Figure 2B:
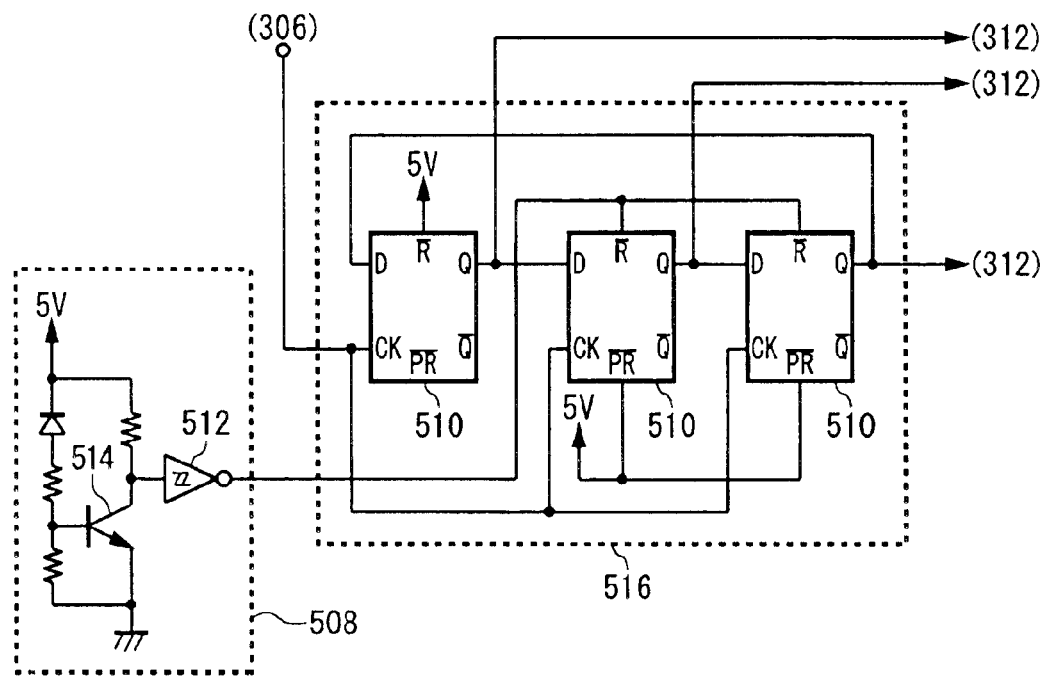
FIG. 2B shows an exemplary circuit structure of a selection signal supplying unit 212.

FIG. 2B shows an exemplary circuit structure of the selection signal supplying unit 212. In this example, the selection signal supplying unit 212 includes a shift register 516 and a reset pulse generation unit 508.

The shift register 516 includes a plurality of D flip-flops 510 provided to correspond to a plurality of light source blocks 58 (see FIG. 1), respectively. The shift register 516 outputs as the light-source selecting signal outputs Q of the D flip-flops 510 in parallel. Each D flip-flop 510 supplies its output Q to the corresponding connection unit 312 (see FIG. 1). In addition, each D flip-flop 510 receives the driving signal at its clock terminal. In this manner, the selection signal supplying unit 212 changes the light-source selecting signal in accordance with the driving signal. Please note that the D flip-flop 510 in the first stage receives at its input D the output Q of the D flip-flops 510 in the last stage.

The reset pulse generation unit 508 includes an NPN transistor 514, a schmitt trigger 512, a diode and a plurality of resistors. The NPN transistor 514 changes a potential at an input of the schmitt trigger 512 in response to the power-on of the vehicular lamp 10 so as to change the output of the schmitt trigger 512. The schmitt trigger 512 changes the output thereof to initialize the shift register 516.

By that initialization, the reset pulse generation unit 508 makes one D flip-flop 510 store a value of 1 and also makes other D flip-flops 510 store a value of 0, for example. In this manner, the shift register 516 outputs the light-source selecting signal that sequentially selects one of the light source blocks 58.

Figure 3A:
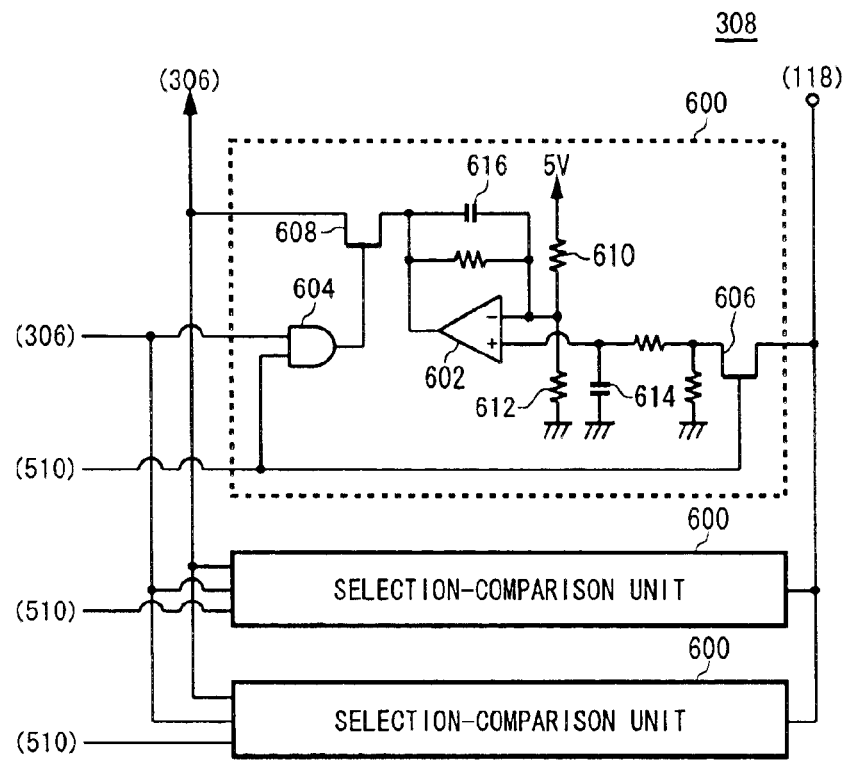
FIG. 3A shows an exemplary circuit structure of a supply current detection unit 308.

FIG. 3A shows an exemplary circuit structure of the supply current detection unit 308. In this example, the supply current detection unit 308 includes a plurality of selection-comparison units 600. The selection-comparison units 600 are provided to correspond to the light source blocks 58 (see FIG. 1), respectively. Each selection-comparison unit 600 includes an analog switch 606, a capacitor 614, an operational amplifier 602, a capacitor 616, an AND operator 604, an analog switch 608 and a plurality of resistors.

The analog switch 606 supplies the supply-current detecting voltage received from the resistor 118 to a positive input of the operational amplifier 602 in a case where the corresponding light source block 58 has been selected in accordance with the light-source selecting signal output from the corresponding D flip-flop 510. The capacitor 614 averages the voltage that the operational amplifier 602 receives at its positive input.

The resistors 610 and 612 supply a reference voltage obtained by dividing a predetermined voltage by a resistance ratio of these resistors to a negative input of the operational amplifier 602. The resistance ratio of the resistors 610 and 612 in each selection-comparison unit 600 may be different. In this case, the resistors 610 and 612 in each selection-comparison unit 600 output the reference voltage that were determined in advance to correspond to the corresponding light source block 58, to the corresponding operational amplifiers 602, the reference voltage being different between the light source blocks 58.

For the operational amplifier 602, a negative feedback is formed. The operational amplifier 602 compares the supply-current detecting voltage received at its positive input with the reference voltage received at its negative input. In this manner, the operational amplifier 602 compares the supply current flowing in the corresponding light source block 58 with a reference value. Moreover, phase compensation is performed for the operational amplifier 602 by the capacitor 616.

The AND operator 604 outputs a logical product, i.e., AND of the driving signal received from the switch controller 306 and the light-source selecting signal received from the corresponding D flip-flop 510 to the analog switch 608. In this manner, the AND operator 604 turns on the analog switch 608 in a case where the driving signal has a predetermined value and the light source block 58 corresponding to this selection-comparison unit 600 is selected. The analog switch 608 supplies the output of the operational amplifier 602 to the switch controller 306 as the result of detection of the supply current by being turned on.

Thus, the switch controller 306 receives the result of comparison of the supply current supplied to the light source block 58 selected by the light source selecting unit 202 with the reference value corresponding to this light source block 58. The switch controller 306 then controls the output voltage of the switching regulator 114 based on the received comparison result.

In other words, the switch controller 306 controls a duration ratio of a period during which the NMOS transistor 130 (see FIG. 1) is on and a period during which the NMOS transistor 130 is off based on the output of the operational amplifier 602 corresponding to the light source block 58 selected by the light source selecting unit 202, thereby controlling the supply current. Thus, the switching, regulator 114 supplies the supply current to each of the light source blocks 58, the supply current being different between the light source blocks 58.

Figure 3B:
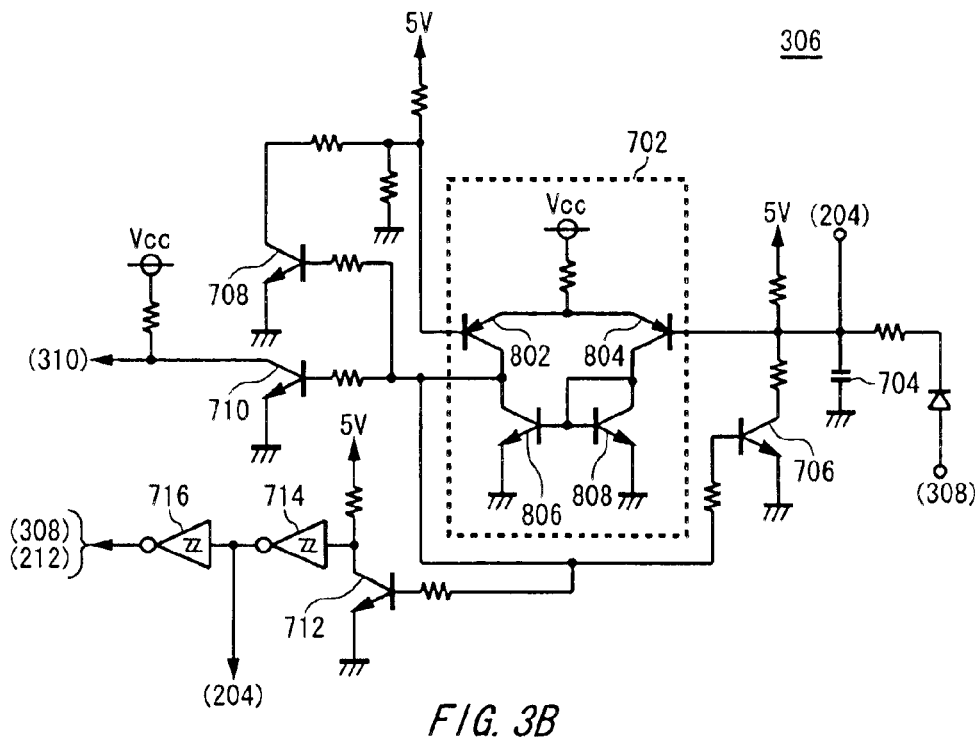
FIG. 3B shows an exemplary circuit structure of a switch controller 306.

FIG. 3B shows an exemplary circuit structure of the switch controller 306. In this example, the switch controller 306 includes an NPN transistor 710, an NPN transistor 712, a Schmitt trigger 714, a Schmitt trigger 716, a comparator 702, a capacitor 704, an NPN transistor 706, a diode and a plurality of resistors.

The NPN transistor 710 supplies a signal in accordance with the output of the comparator 702 to the NMOS transistor 130 (see FIG. 1) via the buffer 310. In this manner, the switch controller 306 makes the switching regulator 114 output the next supply current in accordance with the change of the output of the comparator 702.

The NPN transistor 712 makes the Schmitt trigger 714 supply an inverted signal of the driving signal to the supply end detection unit 204 in accordance with the output of the comparator 702. The Schmitt trigger 716 supplies the driving signal to the supply current detection unit 308 and the selection signal supplying unit 212 in accordance with the output of the Schmitt trigger 714. In this manner, the switch controller 306 changes the driving signal in accordance with the change of the output of the comparator 702. Moreover, the selection signal supplying unit 212 selects the next light source block 58 (see FIG. 1) in accordance with the change of the driving signal.

The comparator 702 includes a PNP transistor 802, a PNP transistor 804, an NPN transistor 806, an NPN transistor 808 and a resistor. A base terminal of the PNP transistor 802 is a negative input of the comparator 702, while a base terminal of the PNP transistor 804 is a positive input of the comparator 702.

The positive input of the comparator 702 receives the result of detection of the supply current from the supply current detection unit 308 via the resistor and diode. The capacitor 704 is charged in accordance with a value received by the positive input of the comparator 702. The NPN transistor 706 receives the output of the comparator 702 at its gate terminal and discharges the capacitor 704 by allowing a collector current to flow in a case where the NPN transistor 706 has been turned on. In this manner, the positive input of the comparator 702 receives a saw-tooth wave signal based on the result of detection of the supply current.

The negative input of the comparator 702 is pulled-up and is electrically connected to a collector terminal of the NPN transistor 708. The NPN transistor 708 receives the output of the comparator 702 at its gate terminal and allows a collector current to flow when the NPN transistor 708 has been turned on, thereby lowering a potential at the negative input of the comparator 702. Thus, the negative input of the comparator 702 receives a voltage having hysteresis. Therefore, the comparator 702 alternately outputs repeatedly a High signal and a Low signal based on the result of detection of the supply current.

In this manner, in this example, the switch controller 306 sequentially changes its output based on the result of detection of the supply current by the supply current detection unit 308. The light source selecting unit 202 selects the respective light source blocks 58 one by one in accordance with the change of the output of the switch controller 306. The switching regulator 114 supplies the next supply current to the light source block 58 selected by the light source selecting unit 202. According to this example, it is possible to appropriately light a plurality of light source blocks 58 by means of a single switching regulator 114. Thus, it is possible to provide a vehicular lamp 10 having a plurality of light source blocks 58 inexpensively.

As is apparent from the above, according to the present invention, it is possible to inexpensively provide a vehicular lamp having a plurality of light sources.

Although the present invention has been described by way of exemplary embodiments, it should be understood that those skilled in the art might make many changes and substitutions without departing from the spirit and the scope of the present invention which is defined only by the appended claims.

What is claimed is:

1. A lighting circuit for lighting a vehicular lamp including a plurality of light sources each having at least one light-emitting diode, comprising:

a switching regulator operable to output an output voltage based on a power-supply voltage received from an external DC power supply;

a light source selecting unit operable to select said light sources one by one and supply a supply current to a selected one of said light sources by applying said output voltage of said switching regulator to said selected one light source; and an output controlling unit operable to control said output voltage output by said switching regulator to said selected one light source based on said supply current supplied to said selected one light source.

2. A lighting circuit as claimed in claim 1, further comprising:

a plurality of capacitors connected in parallel to said plurality of light sources, respectively; and a plurality of diodes connected in forward direction between said switching regulator and said plurality of capacitors, respectively.

3. A lighting circuit as claimed in claim 1, wherein said output controlling unit includes:

reference-value outputting units, provided to correspond to said plurality of light sources, respectively, operable to output reference values different from one another, respectively; and a selection-comparison unit operable to control said output voltage of said switching regulator based on a result of comparison of said supply current supplied to said selected one light source selected by said light source selecting unit with one of said reference values output from one of said reference-value outputting units that corresponds to said selected one light source, and wherein said switching regulator supplies said supply current to each of said plurality of light sources, said supply current being different between said plurality of light sources.

4. A lighting circuit as claimed in claim 1, wherein said switching regulator includes:

a switching device operable to repeatedly switch whether or not a power-supply current based on said power-supply voltage is allowed to flow in said switching regulator; and a coil operable to output said supply current based on said power-supply voltage, and wherein said output controlling unit includes:

a plurality of voltage comparators provided to correspond to said plurality of light sources, respectively, each of said voltage comparator comparing a detecting voltage generated based on said supply current to a reference voltage that was determined in advance to correspond to a corresponding one of said light sources; and a switch controller operable to control said supply current by controlling a duration ratio of a period during which said switching device is on and a period during which said switching device is off based on an output of one of said voltage comparators that corresponds to said selected one light source selected by said light source selecting unit.

5. A lighting circuit as claimed in claim 4, further comprising a selection signal supplying unit operable to supply a light-source selecting signal that specifies said plurality of light sources one by one to said light source selecting unit and said output controlling unit, wherein said light source selecting unit selects one of said light sources specified by said light-source selecting signal and supplies said supply current to said one light source specified by said light-source selecting signal, and said switch controller controls said supply current based on said output of said one of said voltage comparators that corresponds to said one light source specified by said light-source selecting signal.

* * * * *